3,235,076
SEPARATION DEVICE

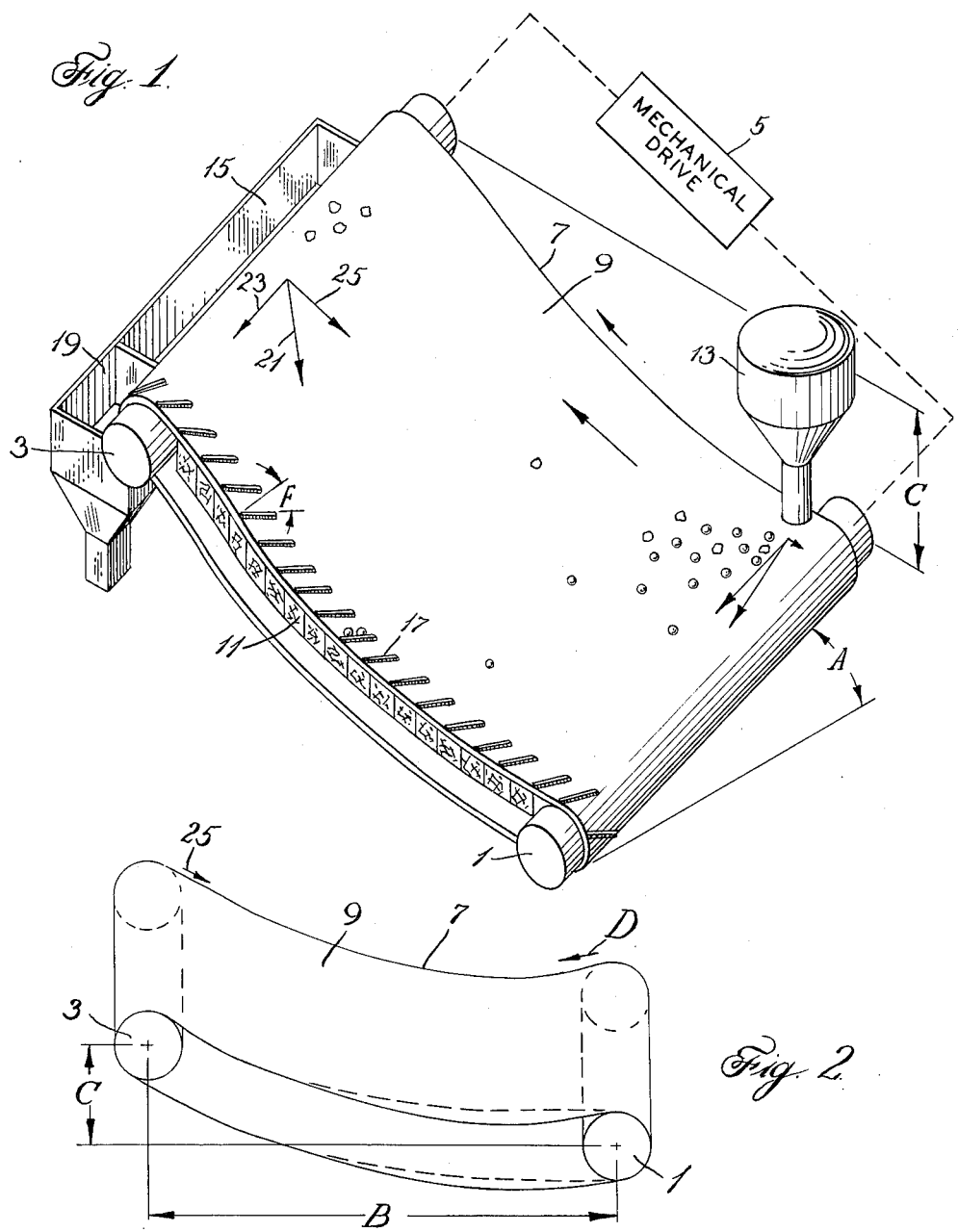
Feb. 15, 1966    F. T. SNYDER ETAL    3,235,076
SEPARATION DEVICE
Filed Feb. 21, 1963
INVENTORS
FRANCIS T. SNYDER
RICHARD O. DeWEESE
BY
ATTORNEY

Francis T. Snyder, Grand Island, and Richard O. De Weese, North Tonawanda, N.Y., assignors to Union Carbide Corporation, a corporation of New York
Filed Feb. 21, 1963, Ser. No. 260,226
2 Claims. (Cl. 209—114)

The present invention is an apparatus for separating solid materials of different shapes. More particularly, the present invention is directed to the recovery of round surfaced solid particles from mixtures of round and irregular surfaced solid particles.

In the manufacture of glass beads, buckshot, hollow spherical bodies, and the like wherein the spherical form of the product is developed by surface tension, while the starting material is in a plastic condition, various factors affect recovery of suitably spherical particles. For example, insufficient plasticity may inhibit the formation of a spherical shape. Also, impact between the produced spheres may result in particles having irregular shapes.

In any event, it is a continuing problem in many industrial activities to separate round from irregular shaped particles.

It is therefore an object of the present invention to provide a relatively inexpensive and easily operated device for separating round from irregularly shaped particles.

Other objects will be apparent from the following description and claims taken in conjunction with the drawing in which:

FIGURE 1 shows, somewhat schematically, an embodiment of the separation device of the present invention and FIGURE 2 is an elevation view of the device of FIGURE 1.

With reference to the drawing, the numerals 1 and 3 indicate rollers which are mechanically driven as shown at 5 so as to move the belt in the direction indicated. The rollers 1 and 3 are parallel as shown and are inclined so as to form the same angle A with the horizontal. However, roller 3 is arranged at a higher position than roller 1 as indicated at C. An endless belt 7, which can be made as a smooth surfaced flexible material, e.g. rubber-coated canvas, is mounted on the rollers as shown and forms a generally concave surface 9 between the rollers. It is to be noted, and this is an important feature of the invention more specifically described hereinbelow, that the surface 9 presents a continuously changing slope. The concave surface presented by the endless belt can sag somewhat as shown by the solid lines in FIGURES 2 of the drawing, or it can be made more taut as indicated by the dotted lines.

This aspect, and the belt material, are not critical so long as a continuously changing slope is provided and particles do not become entrapped in the sagging portion during the separation operation.

A satisfactory contour for the endless belt can be provided by support 11 if necessary. A distributing means such as hopper 13 is provided at the upper portion of the endless belt adjacent the first roller. The hopper contains the admixture of round and irregular particles which are to be separated and the hopper is adjusted so that the particles are introduced into the concave surface in a manner such that a layer of particles is developed on the endless belt.

In the practice of the present invention, round particles can be separated from irregular particles. That is, particles which can roll on the inclined surface of the endless belt can be readily separated from those which do not roll.

Also, a separation between different shaped rolling particles can be achieved, e.g. between spheres and ellipsoids, by adjustment of the inclination of the belt supporting rolls and the difference in height between the belt supporting rolls. Generally a lesser inclination of the rollers and a smaller difference in height between the rollers is used as compared with the arrangement used for separating rolling and non-rolling particles.

In the operation of the apparatus of the present invention, a mixture of round and irregular shaped particles, which can for example be glass, is distributed from hopper 13 onto belt 7.

The particle flow from the hopper is adjusted so that the particles form a layer on the belt 7.

The round particles tend to be carried in the direction of roller 3 and also tend to roll down to the lower part of the belt 7. The irregular particles tend to remain stationary with respect to the belt and move toward roller 3. However, due to mutual interference between the particles, the irregular particles move somewhat diagonally downward across the belt. Nevertheless, by making the belt of a suitable width, substantially all of the irregular particles can be moved over roller 3 and collected in collector 15.

The round particles do not travel over roller 3 but move to the lower portion of the belt and are moved by the ridges to a separaae collector 19.

The provision of a continuously changing slope on the endless belt is important to provide increasing and varying forces on the round particles that cause relative motion between the round and irregular particles and thus prevent entrapment of round particles.

For example, round particles in the vicinity of roller 1 tend to move along the belt at a faster rate than the irregular particles. Also, any round particles approaching the vicinity of roller 3 tend to roll back in the opposite direction. Further, at all times the round particles tend to roll toward the lower portion of belt 7.

In the embodiment illustrated in the drawing, the round particles which move ultimately to the lower part of the belt 7 are moved by ridges 17 to collector 19.

The illustrated ridges 17 are arranged at an angle normal to the maximum slope of the belt. The direction of the maximum slope for the device of FIGURE 1 is indicated as 21. This slope can be determined routinely as the resultant of the slopes, i.e. the gravity forces acting in the directions 23 and 25 as shown in the drawing.

In operation, as previously mentioned, the separated round particles are swept along by ridges 17 and deposited in collector 19. The ridges can be molded into the belt 7 or can be formed of strips of flexible material, e.g. rubber, which are cemented onto the belt. Grooves may also be used in the belt in the place of ridges. Other suitable collecting means can be used for recovering the separated round particles, however, the aforedescribed arrangement is preferred due to its simplified construction.

The following example will further illustrate the present invention.

*Example I*

A separation device constructed as shown in the drawing was used in the separation of glass spheres from a mixture of spheres and irregular particles.

The size of the material in the mixture was 8 mesh by 12 mesh. Some finer irregular material was also present.

The mixture was introduced from a hopper onto a flexible endless belt which was made of plastic covered cloth. The hopper was located over the belt at the upper end of the lower roller.

The belt was 36 inches wide and the distance B between the axes of the roller was 42 inches. The difference in height indicated as C was 5 inches. The angle A, indicating the inclination of the rollers with the horizontal was 2½°. The slopes D and 25 were 2½° and 22½° respectively, below the horizontal.

The diameter of the rollers was 4½ inches and they were driven at a rate which provided a 35 ft. per min. belt speed.

The ridges 17 were formed of rubber cemented onto the belt and formed an angle of 40°, indicated as F with the side of the belt. The rubber ridges were ⅛ inch high, ⅜ inch wide, and 6 inches long.

The device was operated continuously for a period of several months and a practically complete separation of spherical irregular particles was obtained.

The foregoing procedure was practiced with mixtures of 12 mesh by 20 mesh, and 20 mesh by 35 mesh and the same high degree of separation was obtained. The mesh sizes referred to herein are U.S. series.

What is claimed is:

1. An apparatus for separating admixed rounded and irregular particles which comprises first and second parallel rollers inclined at a common angle to the horizontal, the first roller being positioned lower than the second roller; an endless belt arranged between said rollers and defining a surface having a continuously varying slope, said surface being generally concave when viewed from above; means for moving said concave surface of the endless belt from the first to the second roller in a continuous manner; means for providing mixed rounded and irregular particles substantially in a layer on the concave surface of said endless belt; and means in the form of parallel elevated ridges integral with the lower portion of the concave surface for collecting rounded particles separated from the mixture by the increasing and varying forces exerted on the rounded particles by the generally concave surface, said ridges extending in a direction substantially normal to the maximum slope on the concave surface.

2. An apparatus in accordance with claim 1 wherein grooves are arranged in said belt in place of the ridges.

References Cited by the Examiner

UNITED STATES PATENTS

| | | | |
|---|---|---|---|
| 1,141,852 | 6/1915 | Sutton | 209—114 |
| 1,196,048 | 8/1916 | Sutton | 209—114 |
| 1,459,609 | 6/1923 | Austin | 209—114 |
| 2,658,616 | 11/1953 | Stutzman | 209—114 X |

ROBERT B. REEVES, *Primary Examiner.*